(12) United States Patent
Ito et al.

(10) Patent No.: US 6,279,055 B1
(45) Date of Patent: Aug. 21, 2001

(54) DATA OUTPUT DEVICE AND DATA OUTPUT METHOD

(75) Inventors: Norikazu Ito; Hiroyuki Fujita; Satoshi Yoneya; Masakazu Yoshimoto; Satoshi Katsuo; Jun Yoshikawa; Satoshi Yutani, all of Kanagawa; Koichi Sato, Tokyo; Tomohisa Shiga; Masaki Hirose, both of Kanagawa, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/251,115

(22) Filed: Feb. 16, 1999

(30) Foreign Application Priority Data

Feb. 17, 1998 (JP) .................................................. 10-034860

(51) Int. Cl.[7] .................................................. G06F 13/00
(52) U.S. Cl. .................................. 710/45; 710/29; 710/53
(58) Field of Search .......................... 710/20–45, 52–56, 710/58–60; 370/325–379; 368/189.01; 386/46; 365/189.02; 235/492; 711/5; 375/240.14; 348/445; 382/233

(56) References Cited

U.S. PATENT DOCUMENTS

| | | | |
|---|---|---|---|
| 4,119,807 | * | 10/1978 | Nahay .................................. 370/269 |
| 5,058,053 | * | 10/1991 | Gillett .................................. 710/131 |
| 5,487,035 | * | 1/1996 | Nishimura et al. ............. 365/189.02 |
| 5,555,515 | * | 9/1996 | Tomita et al. ....................... 708/300 |
| 5,640,194 | * | 6/1997 | Suzuki et al. ............................ 348/7 |
| 5,848,258 | * | 12/1998 | Fenwick et al. .......................... 711/5 |
| 5,850,483 | * | 12/1998 | Takabatake et al. ................. 382/233 |
| 5,948,081 | * | 9/1999 | Foster .................................... 710/40 |
| 5,950,013 | * | 9/1999 | Yoshimura et al. ................. 235/492 |
| 5,951,654 | * | 9/1999 | Avsan et al. ............................. 710/5 |
| 6,084,637 | * | 7/2000 | Oku et al. ............................ 348/445 |
| 6,115,536 | * | 9/2000 | Iwasaki et al. ...................... 386/106 |
| 6,160,849 | * | 12/2000 | Igarashi et al. ................. 375/240.14 |
| 6,167,467 | * | 12/2000 | Itoh et al. .............................. 710/33 |

* cited by examiner

*Primary Examiner*—Christopher B. Shin
(74) *Attorney, Agent, or Firm*—Frommer Lawrence Haug, LLP.; William S. Frommer

(57) ABSTRACT

A data input/output means comprises memories, each having two banks for storing a volume of data good for predetermined cycled period in an own time slot allocated to it and a control means accesses a recording medium in an own time slot to read out a volume of data for the first predetermined cycle period and store it in the first bank of the date input/output means and also read out a volume of data for the next predetermined cycle period on the way of reading out said data for the first predetermined cycle period and store it in the second bank of said data input/output means before starting the data output from the first bank after the elapse of a predetermined period of time, the switching from said first bank to said second bank being so controlled as to take place at a predetermined timing.

13 Claims, 10 Drawing Sheets

DATA OUTPUT DEVICE AND DATA OUTPUT METHOD

BACKGROUND OF THE INVENTION

1. Field of the Invention

This invention relates to data output device and also to a data output method. More particularly, it relates to a data output device to be suitably used for an AV server in a broadcasting station.

2. Description of the Prior Art

The increased number of channels that have become available for accessing to various types of information due to, if partly, the development of CATV (cable television) in recent years has by turn given rise to a strong demand for novel audio/video data recording/reproducing apparatus adapted to recording and reproducing different set of audio/video data concurrently with a single apparatus. As a matter of fact, apparatus referred to as a video server (or an AV(audio and/or video) server) and adapted to concurrently recording different sets of audio/video data in and also reproducing such data from randomly accessible recording means such as hard disks have getting popularity to meet this demand.

Generally, a video server installed in a broadcasting station is required to show a high data transfer rate and have a huge recording capacity in order to meet various requirements including a high image and sound quality and a long recording time. Thus, attempts have been made to produce a high data transfer rate and a high recording capacity by introducing a data recording/reproducing apparatus capable of dealing with a plurality of hard disk (hereinafter referred to as HD) units concurrently and storing parity data in the apparatus in advance so that the overall reliability of the apparatus may be maintained if one or more than one of the HD units fail. With such an arrangement, it is possible to realize a multi-channel video server adapted to a variety of applications such VOD (video on demand) and NVOD (near video on demand) systems, where same source data comprising a plurality of different sets of audio/video data are recorded in a distributed fashion and then reproduced simultaneously or with slight time differences before they are transmitted through a multiple of channels.

The data recording/reproducing apparatus used in such a video server is based on the RAID (redundant arrays of inexpensive disks) technology of utilizing a plurality of hard disk drives (hereinafter referred to as HDDs), each being adapted to drive a plurality of hard disks, as described in Patterson et al. ("A Case for Redundant Arrays of Inexpensive Disks (RAID)", ACM SIGMOND Conference, Chicago, Ill., Jun. 1–3, 1998.)

According to the above paper, the RAID technology may be classified into five categories, RAID-1 through RAID-5. Category RAID-1 used to write same data in a pair of HDDs. With Category RAID-3, the input data are divided into groups of data having a predetermined length and recorded in a plurality of HDDs, while a parity data is generated as exclusive OR of the corresponding data blocks of each HDD and written in another HDD. With Category RAID-5, on the other hand, data are divided into large units (blocks) and the data of each unit are recorded in an HDD as data block, while the out come of exclusive OR (a parity data) of the corresponding data blocks of each HDD is recorded in other HDDs as a parity block in a distributed fashion.

For the remaining aspects of RAID, reference should be made to the above identified paper.

An AV server as described above comprises a data storage consisting of a plurality of hard disks for storing AV data, a plurality of AV data input/output interfaces (hereinafter referred to as ports) for inputting AV data into and outputting such data from the data storage and a system controller for controlling the operation of the entire system. Each port has a memory for regulating the timing of retrieving our AV data from and that of storing AV into the data storage. Then, an AV server having the above described configuration performs processing operations concurrently for a multiple of channels as the system controller controls the ports in such a way that they are used evenly and cyclically on a time division basis with a predetermined period. More specifically, time slots are allocated to the ports for processing AV data for a channel so that each port performs an input/output processing operation within the time slot allocated to it to realize multi-channel input/output processing operations. Therefore, with such an AV server, time slots are allocated to the ports of the multiple of channels periodically in a rigid fashion. Then, as a general practice, the length of each time slot is made as short as possible in order to minimize the queuing time of each port, provided that the time length required for each port to read and reproduce a given volume of data from the memory at an ordinary rate is secured.

An AV server used by professionals in broadcasting stations and other similar facilities are required by necessity to operate accurately on a frame basis. Thus, with such an AV server, the delay from the time when a data reproduction command is received to the time when the requested AV data are actually reproduced is often required to be fixed (hereinafter referred to as fixed delay). On the other hand, for each of the channels of the AV server to reproduce data continuously without any intermission, said processor should simultaneously control the operation of reading out the specified data from the data storage and storing them in a memory and that of outputting a data already stored in the memory.

With the known AV server of the type under consideration, it is a general practice that the memory of each channel comprises three or more than three banks because a reproduction command is transmitted regardless of the timing at which each channel can access the data storage. Differently stated, each memory is required to have at least three banks in order to secure a fixed delay time regardless of the timing at which the reproduction command is received and said processor is required to carry out its control operations such that any discrepancy of timing may be appropriately. dissipated.

However, the three-bank arrangement of each memory can be disadvantageous in terms of cost and there has been a demand for a two-bank arrangement for memories.

SUMMARY OF THE INVENTION

In view of the above identified problems and other problems, it is therefore the object of the present invention to provide a data output device and a data output method that can secure a fixed delay and, at the same time, output data continuously with memories each having only two banks.

According to an aspect of the invention, the above object is achieved by providing a data output device comprising a plurality of a data input/output means and a control means for allocating time slots to said data input/output means respectively for each cycle period having a predetermined time length, each of said data input/output means being adapted to read data from a non-linearly accessible recording medium and outputting said data in its own allocated time slot, characterized in that:

at least one of said data input/output means having a memory means consisting of first and second banks for storing a volume of data good for a cycle period in its own allocated the time slot; and said control means controlling said recording medium and said memory so as to read out a volume of data good for a first cycle period from said recording medium and store it in the first bank of said data input/output means in its own time slot and so as to read out a volume of data good for a second cycle period on the way of reading out said data good for said first cycle period and store it in the second bank of the data input/output means in the next its own time slot and start outputting data from the first bank after a preselected time, the switching from said first bank to said second bank taking place at a predetermined timing.

According to another aspect of the invention, there is provided a data output method of reading out from a non-linearly accessible recording medium in the own time slots of a plurality of data input/output means allocated with the respective time slots of each cycle period having a predetermined time length and outputting the data, comprising for each of the data input/output means:

a first step of reading out a volume of data good for a first cycle period from the recording medium in its own time slot and storing it in the first bank of said data input/output means;

a second step of reading out a volume of data good for a next cycle period on the way of reading out said data good for said first cycle period store it in the second bank of said data input/output means;

a third step of outputting said data for the first cycle period stored in said first bank after a preselected time; and a fourth step of outputting said data for the second cycle period stored in said second bank at a predetermined timing.

According to still another aspect of the invention, there is provided a data output device comprising a plurality of data input/output means and a control means for allocating time slots to said data input/output means respectively for each cycle period having a predetermined time length, each of said data input/output means being adapted to read data from a non-linearly accessible recording medium and outputting said data in the time slot allocated to it, characterized in that:

at least one of said input/output means having a memory means consisting of first and second banks for storing a volume of data good for a cycle period in its own allocated the time slot;

said control means controlling said recording medium and said memory means so as, upon receiving a control command for reproducing data, to cause said first bank to output the data stored in it after a preselected time period and said second bank to read a volume of data good for a cycle period from said recording medium as data succeeding said data and store it in itself in the next time slot allocated to said data input/output means after the time slot used for storing said data into said first bank, the switching from said first bank to said second bank taking place at a predetermined timing.

According to a further aspect of the invention, there is provided a method for reading out from a non-linearly accessible recording medium in the own time slots of a plurality of data input/output means allocated with the respective time slots of each cycle period having a predetermined time length and outputting the data, comprising for each of the data input/output means:

a first step of causing said first bank of said data input/output means, upon receiving a control command for reproducing data, to output the data read out from said recording medium and stored in it its own allocated time slot after a preselected time period;

a second step of reading out a volume of data good for a cycle period from said recording medium as data succeeding said data and storing it in the second bank of said data means in the next own time slot after said own time slot; and a third step of switching from said first bank to said second bank so as to make the data output is said second step immediately succeed the data output in said first step.

With a data output device and a data method according to the invention, a fixed delay can be secured for any data output command regardless of the timing of issuance of the command and data can be output continuously by using memories, each having two banks. Thus, the memory capacity can be remarkably reduced to by turn reduce the manufacturing cost if compared with known similar data output device and data output method designed to achieve the same objective by using memories, each having three banks.

DETAILED DESCRIPTION OF THE PREFERRED EMBODIMENTS

Figure 1:
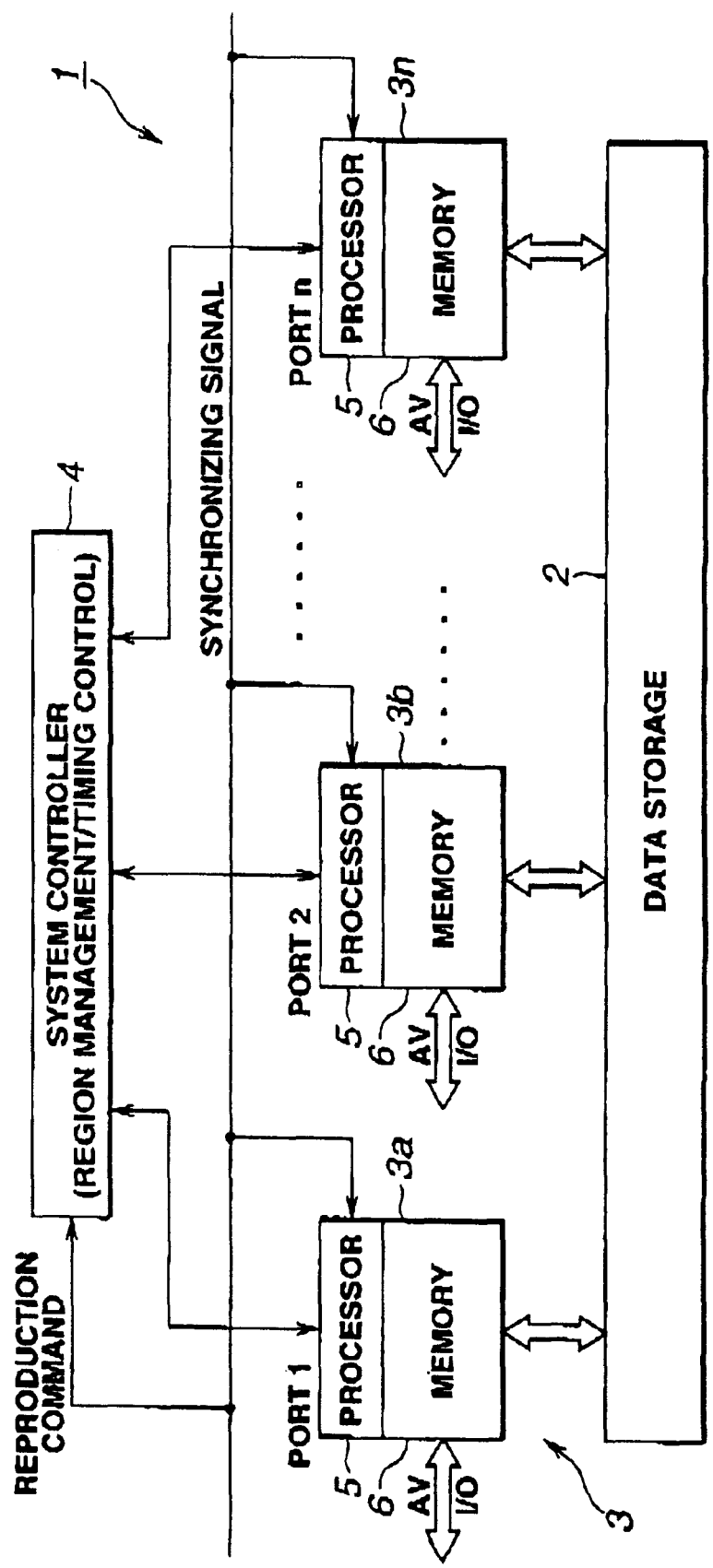
FIG. 1 is a schematic block diagram of an AV server realized by applying the present invention.

Now, the present invention will be described in greater detail by referring to the accompanying drawings that illustrate preferred embodiments of the invention. FIG. 1 is a schematic block diagram of an AV server 1 realized by applying the present invention and adapted to storing, reproducing editing and delivering data including AV data through a plurality of channels, said AV server comprising a data storage 2 for storing AV data, a plurality of AV data input/output interfaces 3 (hereinafter referred to as ports) ($3a, 3b, \ldots, 3n$) to be used for accessing the data storage 2 and a system controller 4 for controlling the overall operation of the system.

The data storage 2 is a disk array unit prepared by arranging a plurality of hard disk drives (HDDs) to produce a RAID (redundant arrays of inexpensive disks) configuration as described earlier by referring to the prior art such that AV data may be read out from or write into predetermined areas of the hard disks independently and concurrently through the respective ports.

A shown in FIG. 1, each of the ports 3 comprises a processor 5 and a memory 6. The processor 5 accesses a predetermined area of the data storage 2 in the time slots allocated to it by the system controller 4. The processor 5 additionally regulates the timing for reading AV data from a recording AV data to the data storage 2 by controlling the operation of storing data into or outputting data from the memory 6 in the time slots allocated to is by the system controller 4. Still additionally, the processor 5 carries out processing operations for recording/reproducing data when storing data into or reading out data from the memory 6 as will be described hereinafter.

Figure 2:
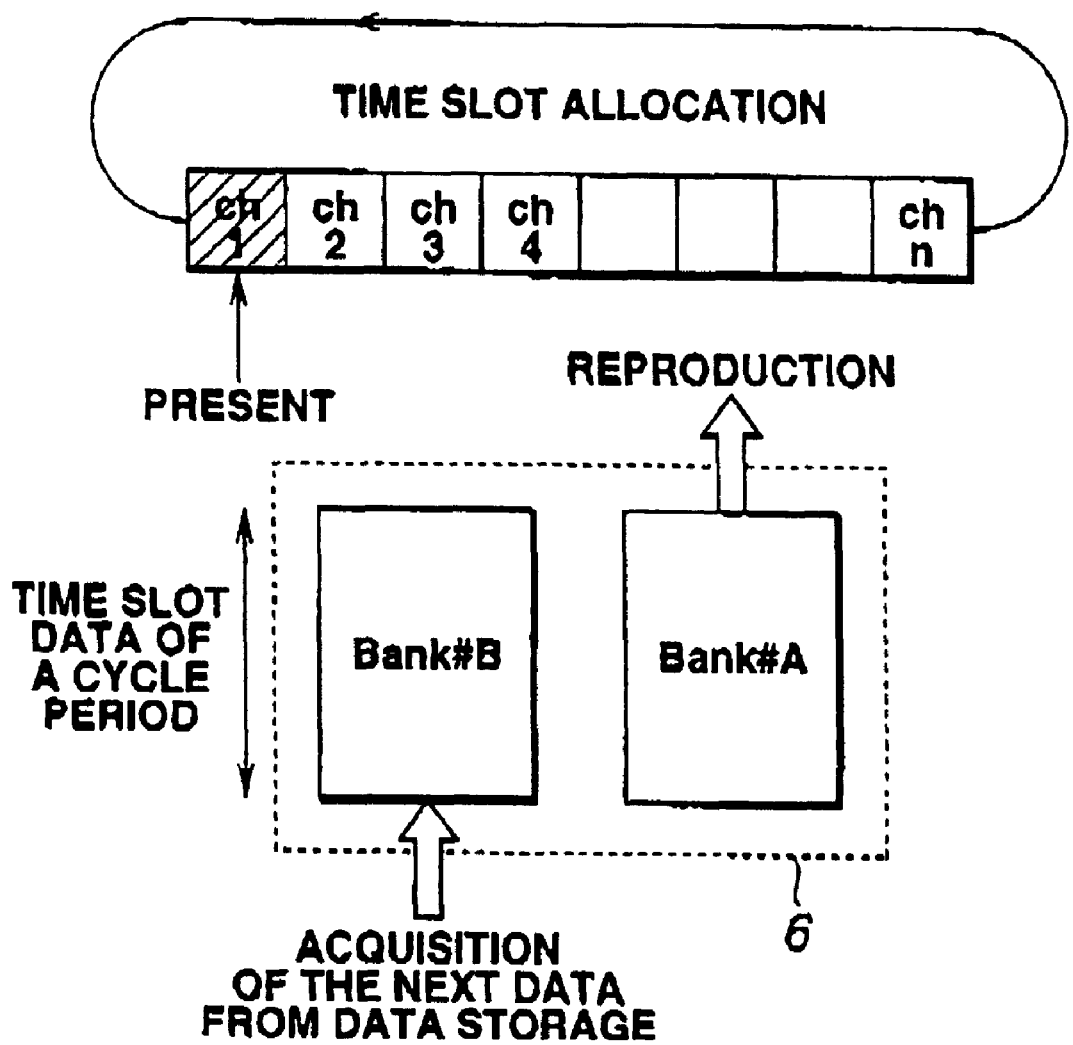
FIG. 2 is a schematic illustration of the configuration of the memory of each AV data input/output interface of the AV server of FIG. 1.

As shown in FIG. 2, the memory 6 comprises two banks (Bank #A, Bank #B). Simply for the sake of convenience, the ports 3a, 3b, . . . , 3n will be referred to as port 1, port 2, . . . , port n hereinafter.

In the AV server 1, the system controller 4 allocates to the ports time slots that can be used for accessing the data storage 2 on a time division basis so that the AV data may be accessed concurrently through the n ports for AV data recording or AV data reproducing operations. More specifically, referring to FIG. 2, the system controller 4 uses a cycle period as fixed period and divides it evenly by n, the obtained n time slots being allocated to port 1 through port n on a sequential basis. Therefore, each port is allocated with a time slot in each cycle period, which is equal to 1/n of the period.

The processor 5 of each port carries out its AV data recording/reproducing operation under the control of the system controller 4 in a manner as described below. For recording data, the processor 5 converts the AV data fed from an external block into a data format good for recording them into the hard disks of the data storage 2 and compresses them, if necessary, before it stores the processed data into the banks of the memory 6 sequentially. When an own time slot is assigned to it, it then transmits the data to the data storage 2 and records the data there. Techniques that can be used for the compression include the MPEG and JPEG systems that utilize inter-frame relations and the DV system that utilizes intra-frame compression. Data input from the outside are typically provided in the SDI (Serial Data Interface) format standardized according to SMPTE-259M or SDTI (Serial Data Interface) format standardized according to SMPTE-305M. The processor 5 takes out AV data in such format.

For reproducing data from the data storage 2, the processor 5 reads out a volume a data good for a time slot cycle period from the data storage 2 when an own time slot is allocated to it and stores the data in any of the banks of the memory 6. If necessary, it then expands the data when the next time slot is allocated to it and converts the data into a format such as SDI or SDTI adapted to outputting the data to the outside before it actually outputs the data, while it reads out a volume of data good for another time slot cycle period from the data storage 2 and stores the data in any of the remaining banks of the memory 6. Besides the above listed SDI and SDTI formats, data formats to be used for outputting data to and inputting data from the outside include Fibre Channel and ATM (Asynchronous Transfer Mode).

The length of each time slot allocated to a port is so selected that volume of AV data that may be reproduced continuously within a period from a time slot to the next allocated to it can be stored from the data storage 2 to the memory 6 of that port. Thus, from the viewpoint of port 1, data for a time slot cycle period are stored in Bank B when a time slot is allocated to port 1 and the data stored in Bank B are reproduced the time when a time slot is allocated to port 2.

Referring to FIG. 2, then data are stored in Bank A when a time slot is allocated in the next cycle period so that the data in Bank B may be continuously reproduced until the operation of storing data in Bank A terminates. Then, as the time slot of port 2 comes, the operation of reproducing data from Bank 2 is terminated, when an operation of reproducing data stored in Bank A of port 1 starts.

Thus, in the AV server 1, each memory 6 can output continuously without intermission from one of its banks to continue its data reproducing operation until the next time slot of the port itself (hereinafter referred to as own time slot) is allocated.

Additionally, the length of a time slot cycle period is so selected that a volume of AV data necessary or an ordinary data reproducing operation can be read out and stored in one of the banks of the memory 6 during that period, although the length has to be made as short as possible.

The system controller 4 controls the processor 5 of each port according to the input/output control signal fed from a control panel (not shown) or some other signal source. The input/output control signals that the processor 5 receives contain commands for normal data recording and reproduction, stopping the data recording/reproducing operations, slow data reproduction, high speed data reproduction, reversal replaying as well as additional information such as information on the replaying magnification ratio for high speed data reproduction with variable speed.

For the convenience of explanation, assume hereinafter that the AV server 1 comprises a total of 8 ports (8 channels) and each time slot cycle period is divided into 8 time slots and that a volume of AV data good for 32 frames will be reproduced from the AV server 1 in a time slot cycle period with the normal replay speed, or a magnification ratio of 1. Therefore, as shown in FIG. 2, the memory 6 of each channel can store in each of its banks a volume of data good for a time slot cycle period or 32 frames. In other words, a volume of data for 32/8=4 frames in a time slot from a bank of the AV server 1 for a normal speed replaying.

Then, the AV server 1 having the above configuration, the processor 5 of each port controls its memory 6 in a manner as will be described hereinafter to reproduce data and read out data from the data storage 2 concurrently so that data may be reproduced continuously without intermission strictly with a fixed delay.

Figure 3:
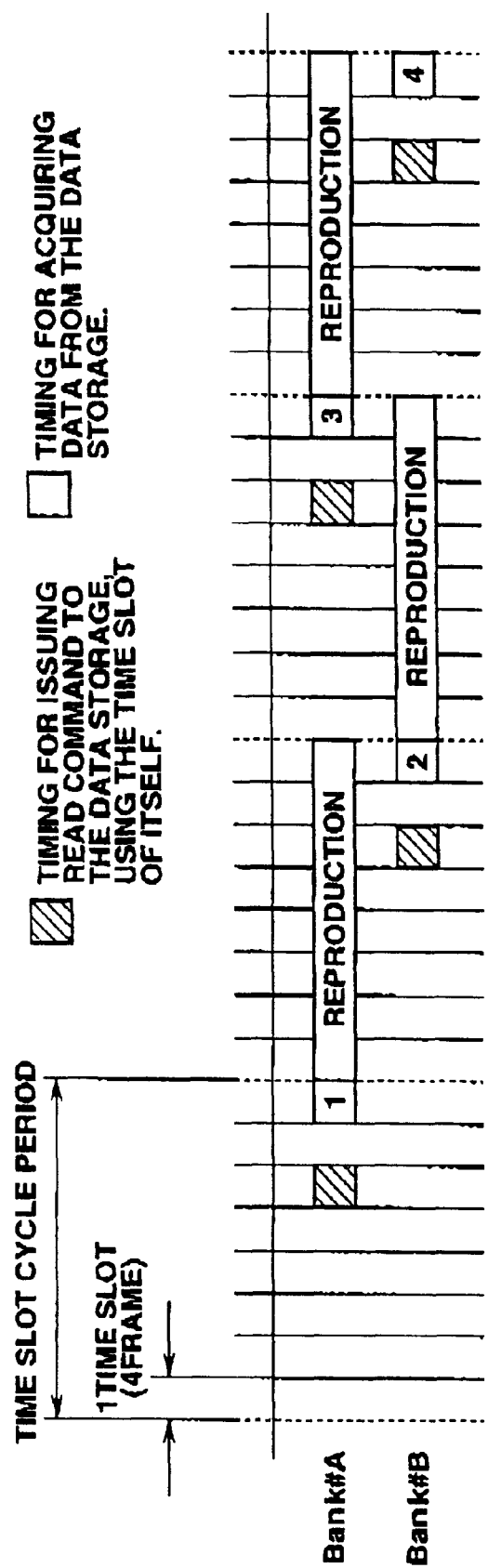
FIG. 3 is a timing chart illustrating the control operation of the AV server of FIG. 1 in a steady state for data reproduction.

FIG. 3 is a timing chart illustrating the control operation in a steady state for data reproduction. In an own time slot, each of Bank A and Bank B stores a volume of data good for a time slot cycle period and immediately thereafter outputs and reproduces (hereinafter simply referred to as reproduces) the data. Then, it repeats the same operation of storing and reproducing data.

FIG. 3, each column represents a time slot and, in the case of the illustrated embodiment, a time slot is equal to the time period of four frames (4/30 seconds) to make 8 time slots (32 frames) equal to the time period of a time slot cycle period. Thus, each port reads out a volume of data good for 1 time slot cycle period=8 time slots (32 frames) from either one of its banks within the own time slot allocated to it.

Upon receiving a data reproduction (PLAY) command from the system controller 4, the processor 5 of each port issues a READ command to the data storage 2 according to the control signal from the system controller 4. When the own time slot comes, it reads out a volume of data good for 8 time slots from the data storage 2 and stores it in Bank A at a timing delayed by 2 time slots from the time of issuance of the command. More specifically, in this embodiment, a volume of data for 8 time slots is stored in a bank in the time slot after the next to the one when the READ command is issued.

Now, the process of controlling a bank for the start of a normal data reproducing operation in the AV server 1 will be described. The process of controlling the start of a data reproducing operation varies depending on the timing of receiving the reproduction (PLAY) command for a channel and the state of the memory 6 of the channel. The state of the memory 6 may be a non-prefetched state where no data is stored in any of the banks or a prefetched state where data is stored in each of the banks. In either state, the data reproducing operation is required to start with a fixed delay after receiving the reproduction (PLAY) command. Additionally, a bank is in a prefetched state generally when the data is required to be output quickly so that the fixed delay is required to be made as short as possible. The AV server 1 performs a control operation as will be described below to meet the above requirements.

Figure 4:
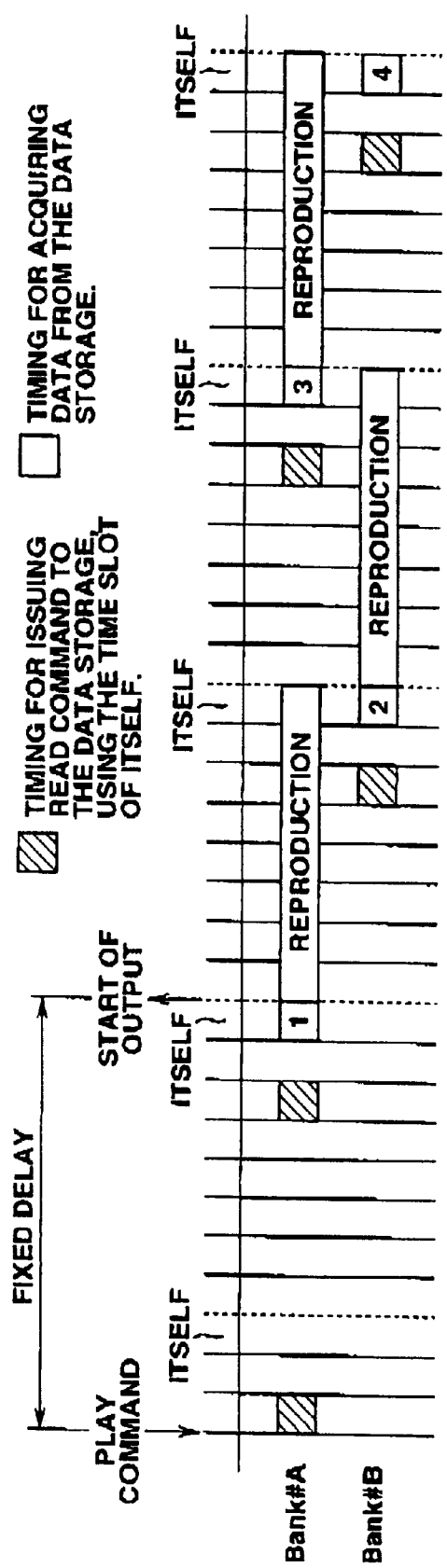
FIG. 4 is a timing chart illustrating the control operation for starting data reproduction upon receiving a data reproduction command.

FIG. 4 illustrates the control operation for the worst ease when a port is required to reproduce data in a non-prefetched state or, more specifically, when the timing of issuing a READ command to the data storage 2 coincides with the timing of receiving a reproduction (PLAY) command from the system controller 4 so that the execution of the reproduction command runs short of time and is forced to waste the longest waiting time. Then, it issues a READ command for the reproduction (PLAY) command after a time slot cycle period so that it takes the time period of a time slot (44 frames, 44/30 seconds) before reproducing data from the storage 2 in its own time slot, which time period is used as the fixed delay for the non-prefetched state.

Figure 5:
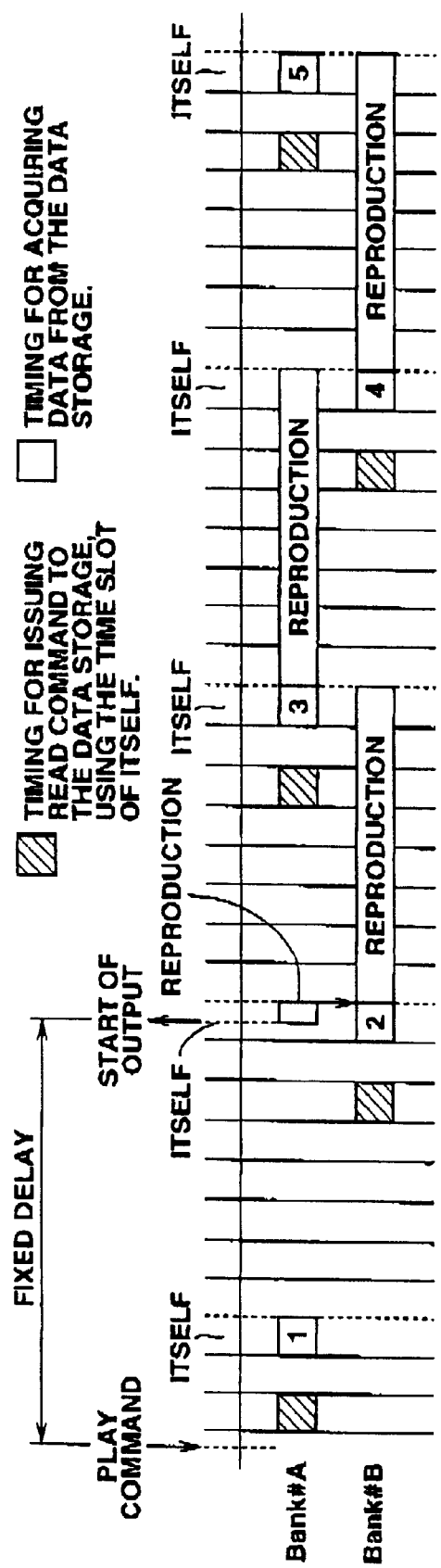
FIG. 5 is a timing chart also illustrating the control operation for starting data reproduction upon receiving a data reproduction command.

FIG. 5 illustrates the control operation for the best case when a port is required to reproduce data in a non-prefetched state of its channel or, more specifically, when the timing of issuing a READ command to the data storage 2 comes immediately after the timing of receiving a reproduction (PLAY) command from the system controller 4 so that a volume of data good for 8 time slots can be stored in a bank within the shortest period of time but the operation of outputting data is made to wait for said fixed delay (the time period of a time slot). After waiting for the fixed delay, the bank that has acquired a volume of data good for 8 time slot (Bank A in FIG. 5) outputs a volume of image data for the number of frames (e.g., 2 frames) counted until the start of the next time slot. Bank B, on the other hand, reads out a volume of image data for the number of frames obtained by subtracting the number of frames for the data output from Bank A from 32 frames for a frame cycle period (or 32−20=30 frames and from frame 3 through frame 32 in the case of FIG. 5) and outputs the data.

Then, Bank A reads out the image data from frame 33 to frame 62 and outputs to immediately follow the above image data output from Bank B. Thereafter, the operation of reading out and reproducing image date of Bank A and that of Bank B are repeated alternately. Thus, in the AV server 1, the processor 5 controls the memory 6 and the data storage 2 in such a way that the image data for the first time slot cycle period (32 frames) are stored in both Bank A and Bank B so that image data may be reproduced continuously without intermission, keeping the fixed delay after the issuance of a reproduction (PLAY) command regardless of the timing at which the reproduction (PLAY) command is issued.

Note that, while only the data of frame 1 and frame 2 are read out at the time when Bank A reads out data for the first time in the above embodiment, it may alternatively be so arranged that the data of all the frames of frame 1 through frame 32 are read out and the data of frame 3 through frame 32 are destructed subsequently. Similarly, while the data of frame 3 through frame 32 are read out at the time when Bank B reads out data for the first time in the above embodiment, it may alternatively be so arranged that the data of all the frames from frame 3 through frame 34 are read out and the data of frame 33 and frame 34 are destructed subsequently.

The control operation for reproducing data in a non-prefetched state is describe above. However, it is possible to reproduce image data continuously without intermission with a fixed delay after the issuance of a reproduction (PLAY) command in a prefetched state by means of a similar control operation. More specifically, in a prefetched state, the data read out by one of the banks for the first time is reproduced not immediately but after a predetermined period of time, or a fixed delay. The fixed delay is preferably made as short as possible. The data read out by said one of the banks can quickly move into a stable state adapted to data reproduction by controlling it to be reproduced by a predetermined volume the corresponds to the timing of receiving a reproduction (PLAY) command.

Note that the process of controlling a bank for the start of a normal data reproducing operation varies in terms of the volume of data to be reproduced for the data read out by one of the banks for the first time and the method of calculating the number of frames to be read out by the other bank depending on the timing at which a reproduction (PLAY) command is received for the port. However, once the method of calculating the number of frames to be read out by the other bank is determined, the volume of data to be reproduced for the data read out by said one of the banks for the first time will be determined automatically. Now, the calculation method will be described for both a prefetched state and a non-prefetched state.

Figure 6:
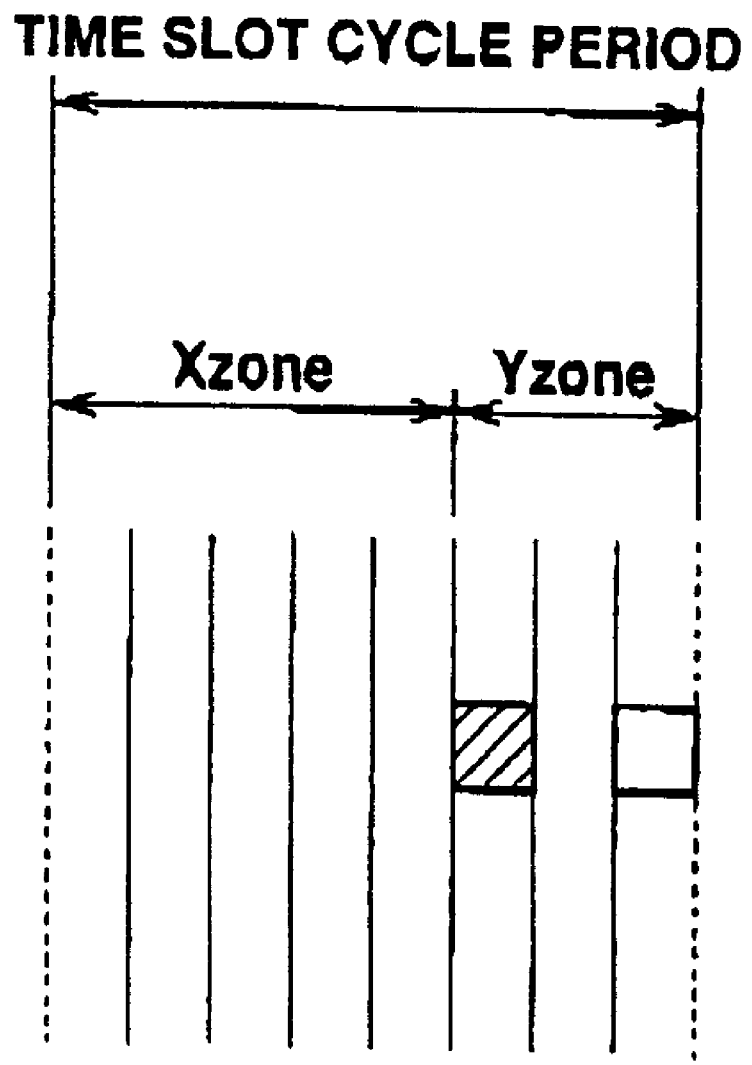
FIG. 6 is a schematic illustration of the zones for receiving a data reproduction command.

Referring to FIG. 6, the method of calculating the number of frames to be read out varies between the case where a reproduction (PLAY) command is received between the first and fifth time slots (to be referred to as X zone hereinafter) of a time slot cycle period and the case where a cycle period is received between the sixth and eighth time slots (to be referred to as Y zone hereinafter) of a time slot cycle period. It also varies between a prefetched state and a non-prefetched state.

The Y zones is defined here as the time period as expressed in terms of the number of time slots from the time of issuance of READ command and the time of actually acquiring the corresponding data. The X zone, on the other hand, is defined as the time period as expressed in terms of the number of time slots obtained by subtracting the number of time slots of the Y zone from the number of time slots of a time slot cycle period.

Figure 7:
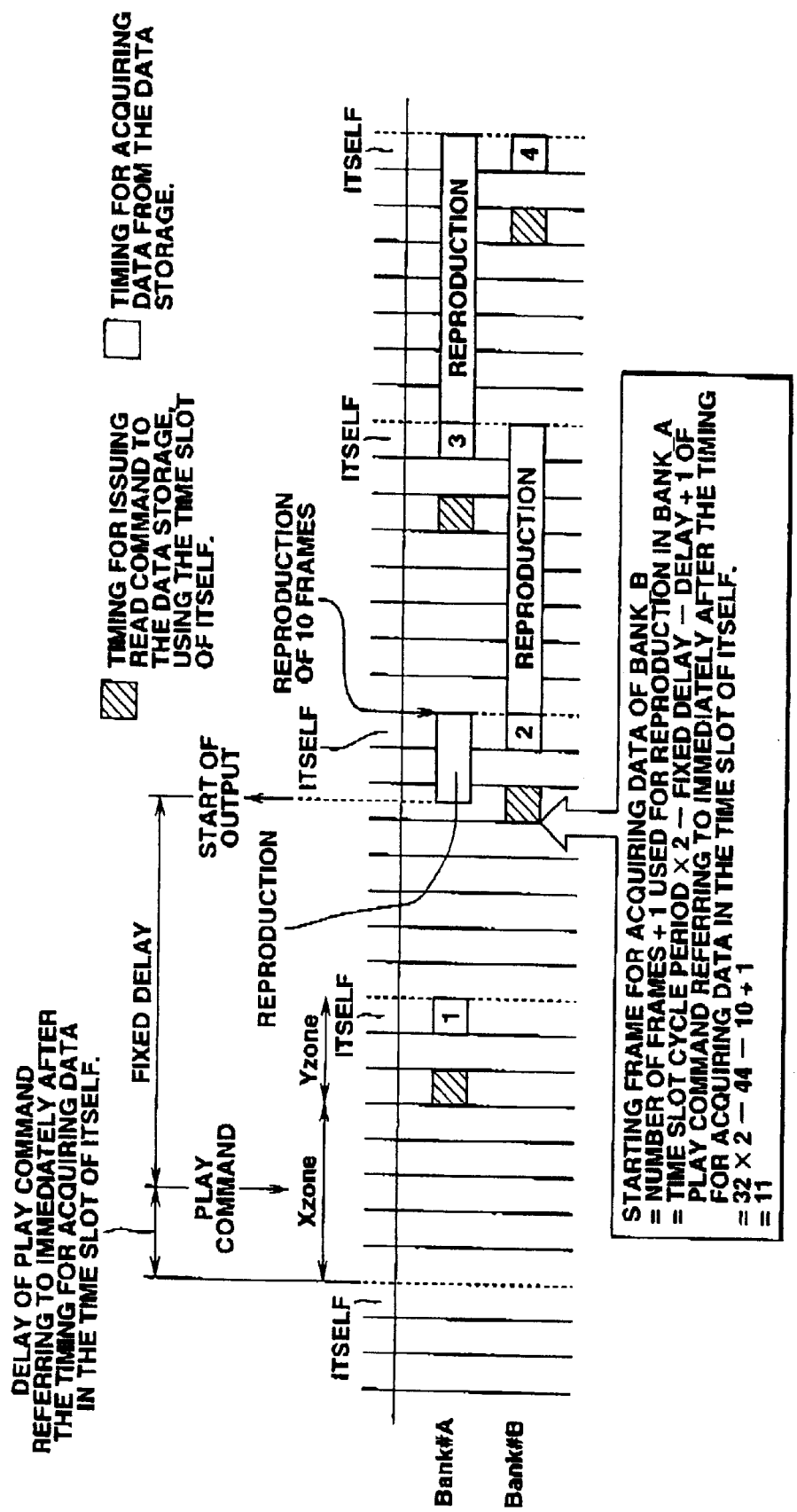
FIG. 7 is a timing chart illustrating the control operation when a data reproduction command is received in zone X.

FIG. 7 is a timing chart illustrating the control operation when a data reproduction command is received in the X zone and the banks are in a non-prefetched state. Then, the frame at which Bank A starts acquiring data is obtained by the equation below.

The frame at which Bank B starts acquiring data
=the number of frames reproduced by Bank A+1
=time slot cycle period (32)×2−fixed delay (44)−the delay of the reproduction command as expressed by referring to the timing of the completion of acquiring data within the own time slot+1.

Then, in the above example, the frame at which Bank B starts acquiring data
=32×2−44−10+1
=11th frame.

In other words, upon receiving a reproduction command in X zone, the processor 5 of the channel determines the frame at which Bank B starts acquiring data by calculation using the above equation. Then, the processor 5 controls the data storage 2 and the memory 6 so as to store a volume of data good for the first 32 frames, e.g., from frame 1 to frame 32, in Bank A in the first own time slot after the reception of the reproduction command and then store a volume of data good for the frames from frame 11 through frame 42 in Bank B in the next own time slot. Thereafter, the processor 5 waits for a period of time equal to the fixed delay from the time of receiving the reproduction command and, after the elapse of the fixed delay, it controls the memory 6 so as to reproduce the data for the first 10 frames out of the data stored in Bank A for the first 32 frames. As a result, data are reproduced from Bank A from the end of the own time slot.

Then, the processor 5 so controls the memory 6 that the data stored in Bank B is reproduced when the reproduction of the data for the first 10 frames is over. More specifically, the processor 5 controls the memory 6 in such a way that Bank A is switched to Bank B for data reproduction when the reproduction of the data for the first 10 frames is over. As a result, data is reproduced from Bank B the moment when the own time slot is over so that the subsequent data reproducing operation is conducted in a steady state for data reproduction.

Figure 8:
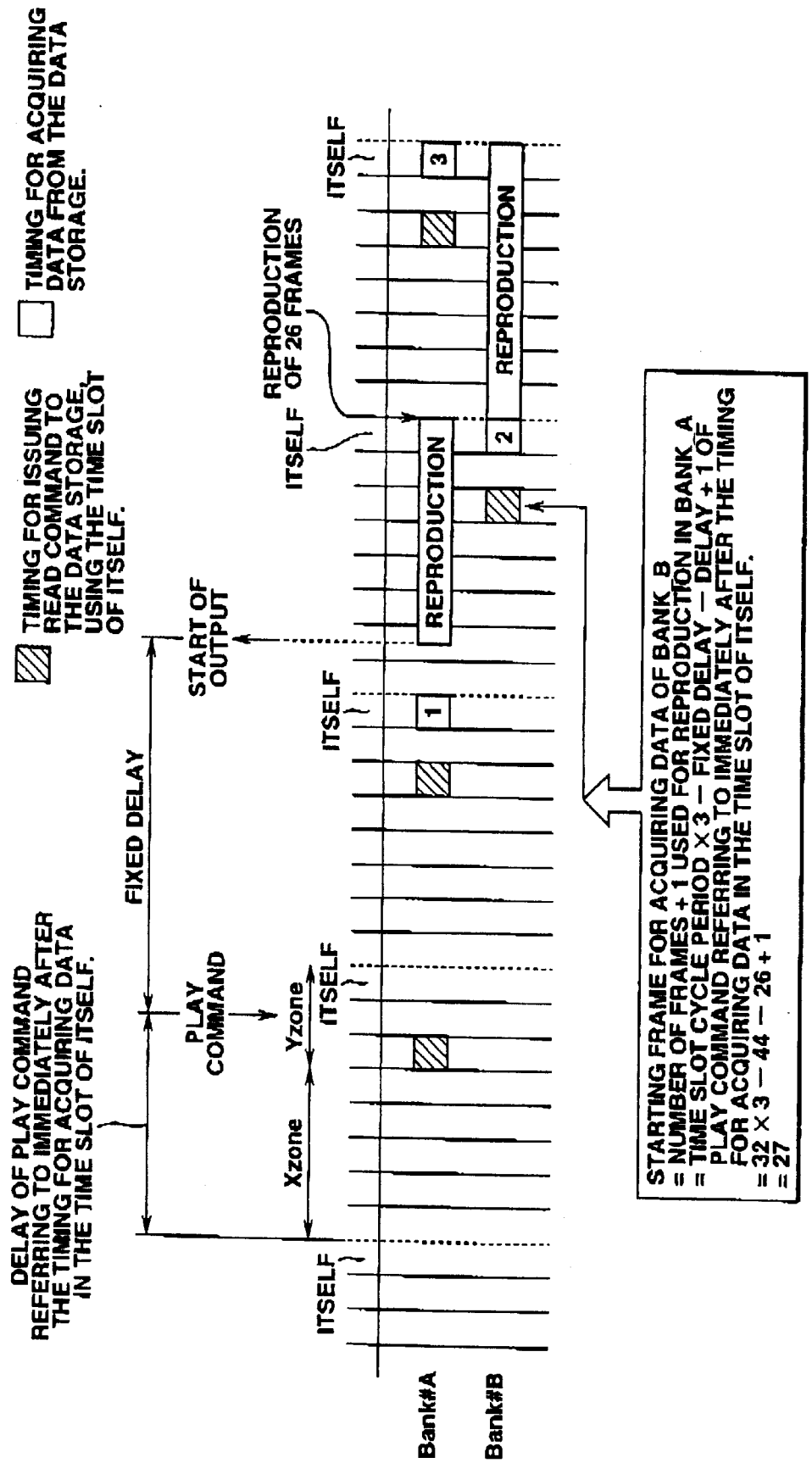
FIG. 8 is a timing chart illustrating the control operation when a data reproduction command is received in zone Y.

FIG. 8 is a timing chart illustrating the control operation when a data reproduction command is received in the Y zone and the banks are in a non-prefetched state. Then, the frame at which Bank A starts acquiring data is obtained by the equation below.

The frame at which Bank B starts acquiring data
=the number of frames reproduced by Bank A+1
=time slot cycle period (32)×3−fixed delay (44)−the delay of the reproduction command as expressed by referring to the timing of the completion of acquiring data within the own time slot +1.

Then, in the above example, the frame at which Bank B starts acquiring data
=32×3−44−26+1
=27th frame.

In this case again, a steady state for data reproduction is realized from the time when data is output from Bank B by the above described control operation.

As discussed above, when the banks of the memory 6 are in a non-prefetched state, the constant used to multiply the time slot cycle period (32) for determining the frame at which Bank B starts acquiring data varies depending on if the reproduction command is received in the X zone or in the Y zone.

Now, the method of determining by calculation the frame at which Bank B starts acquiring data and also the frame at which Bank A starts acquiring data when a data reproduction command is received in the X zone and Bank A is in a prefetched state (where a volume of data good for 32 frames has already been stored) will be discussed below. As described above, the fixed delay should be made as short as possible for banks in a prefetched state so that the fixed delay is assumed to be equal to the time period of a frame (1/30 seconds) in the following discussion.

Figure 9:
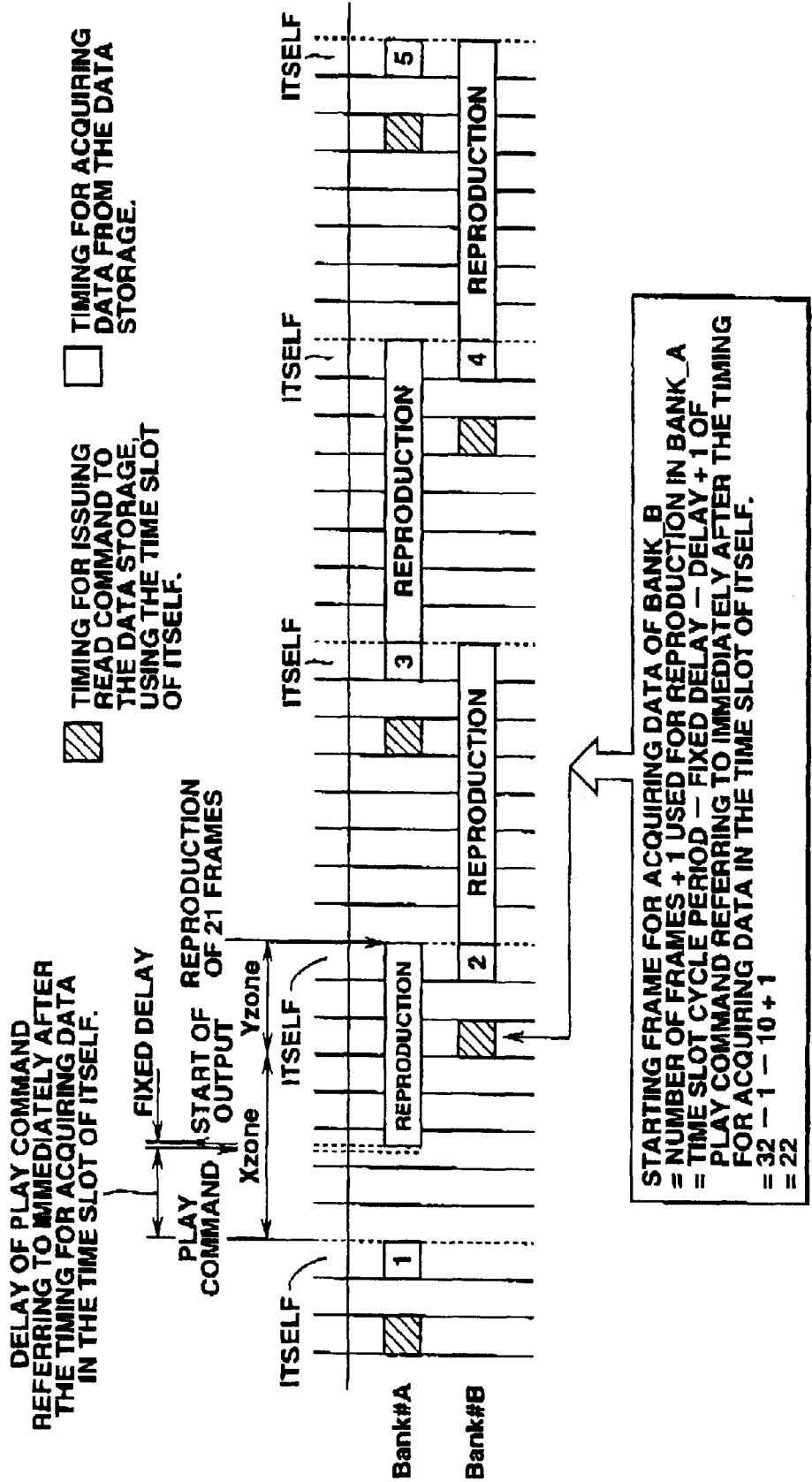
FIG. 9 is a timing chart illustrating the control operation when a data reproduction command is received in zone X.

FIG. 9 is a timing chart illustrating the control operation when a data reproduction command is received in the X zone and the banks are in a prefetched state. Assume here that the reproduction command is received after a time period equal to 10 frames after the data is prefetched to Bank A. Then, the frame at which Bank A starts acquiring data is obtained by the equation below.

The frame at which Bank B starts acquiring data
=the number of frames reproduced by Bank A+1
=time slot cycle period (32)×1−fixed delay (1)−the delay of the reproduction command as expressed by referring to the timing of the completion of acquiring data within the own time slot +1.

Then, in the above example, the frame at which Bank B starts acquiring data
=32×1−10+1
=22th frame.

In another words, the processor 5 of the channel so the controls the data storage 2 and the memory 6 that volume of data good for the first 32 frames, e.g., frame 1 through frame 32, is fetched to Bank A in the own time slot and waits for the reception of a reproduction command. Upon receiving a reproduction command in X zone, the processor 5 waits for the time period of the fixed delay from the time when the reproduction command is received and, when the time period elapses, it controls the memory 6 so as to start reproducing the data stored in Bank A. Then, the processor 5 determines the frame at which Bank B starts acquiring data by calculation using the above equation and controls the memory 6 so as to reproduce a volume of data good for the first 21 frames from Bank A on the basis of the output of the above calculation. As a result, data will be reproduced from Bank A until the end of the own time slot as shown in FIG. 9.

Then, the processor 5 so controls the data storage 2 and the memory 6 that the data of frame 22 through 53 are stored in Bank B in the next own time slot. Additionally, the processor 5 so controls the memory 6 as to reproduce the data stored in Bank B when the operation of reproducing the data of the first 21 frames from Bank A is over. More specifically, the processor 5 controls the memory 6 in such a way that Bank A is switched to Bank B for data reproduction when the reproduction of the data for the first 21 frames is over. As a result, data is reproduced from Bank B the moment when the own time slot is over so that the subsequent data reproducing operation is conducted in a steady state for data reproduction.

Figure 10:
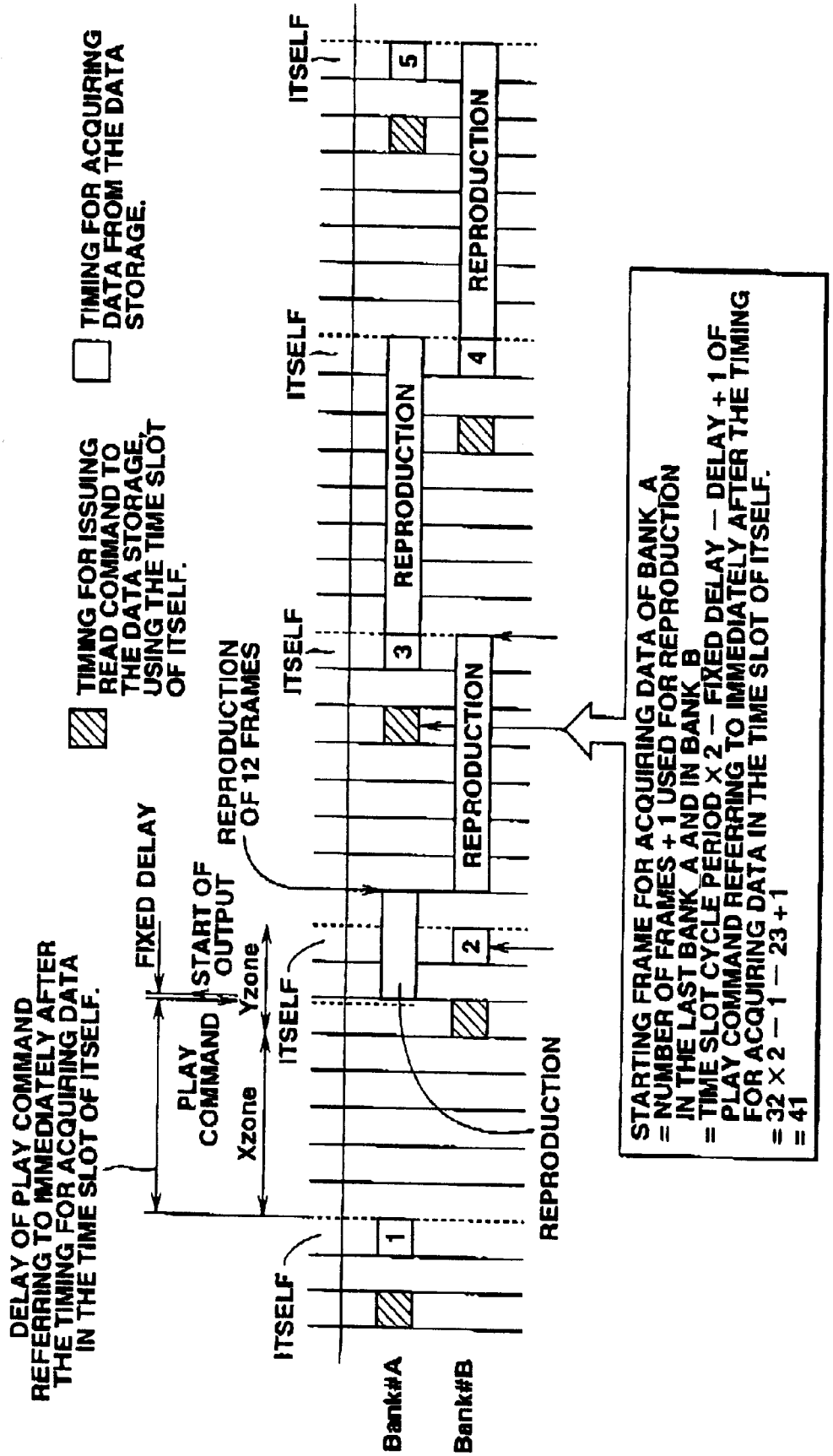
FIG. 10 is a timing chart illustrating the control operation when a data reproduction command is received in zone Y.

FIG. 10 is a timing chart illustrating the control operation when a data reproduction command is received in the Y zone and the banks are in a prefetched state. Assume here that the reproduction command is received after a time period equal to 23 frames after the data is prefetched to Bank A.

This corresponds to a case where no reproduction command comes in the X zone and some processing operation has to be conducted for the next own time slot. Then, the processor 5, upon finding that no reproduction command comes in the X zone, controls the data storage 2 and the memory 6 in such away that a volume of data good for frame 13 through frame 32 is stored in Bank B in the next own time slot. When a reproduction command is received in the Y zone, the processor 5 waits for the time period of the fixed delay from the time when the reproduction command is received and, as the time period elapses, it so controls the memory 6 as to reproduce the data for the first 12 frames out of the data for 32 frames stored in Bank A.

Additionally, the processor 5 so controls the memory 6 that the data stored in Bank B is reproduced when the operation of reproducing the data for the first 12 frames from Bank A is over. Then, the processor 5 controls the memory 6 in such a way that Bank A is switched to Bank B for data reproduction when the reproduction of the data for the first 12 frames is over. In this case, the time when the operation of reducing data from Bank A is over does not coincide with the time when the own time slot is over so that the timing of the start of reproducing data from Bank B will be delayed.

Note that the switch from Bank A to Bank B for data reproduction is not limited to the time when the operation of reproducing the data for the first 12 frames is over and, alternatively, it may be during the time period between the end of reproducing the data for the first 12 frames and the time of issuance of a READ command for storing data from the data storage 2 to Bank A. Then, it may be so arranged that data is not reproduced from the head (the 13th frame) of Bank B but from an intermediary frame corresponding to the time when the switching to Bank B takes place.

Subsequently, the processor 5 carries out the following calculation and controls the data storage 2 and the memory 6 on the basis of the above calculation in such a way that the data for 32 frames starting from the frame at which the data acquiring operation starts will be stored in Bank A in the next own time slot.

The frame at which Bank A starts acquiring data is obtained by the equation below.

The frame at which Bank A starts acquiring data
=the number of frames reproduced by Bank A and Bank B+1
=time slot cycle period (32)×2−fixed delay (1)−the delay of the reproduction command as expressed by referring to the timing of the completion of acquiring data within the own time slot +1.

Then, in the above example, the frame at which Bank B starts acquiring data
=32×2−1−23+1
=41th frame.

In other words, if the data acquired by Bank A from the data storage 2 a volume of date good for 32 frames from the 41st frame and the data is reproduced immediately thereafter, no discontinuity will occur to the frames. More specifically, the processor 5 of the channel so controls the memory 6 that Bank B is switched to Bank A once Bank A requires data from the data storage 2 and a steady state is realized for data reproduction from the 41th frame when Bank A starts outputting data.

As described above in detail, in an AV server 1 having a configuration as described above, where each channel has only two banks, a fixed delay can be secured for any data reproduction command regardless of the timing of issuance of the command and data can be reproduced continuously without any intermission. Thus, with such an AV server 1, the memory capacity can be reduced to ⅔ of that of any know similar data output device designed to achieve the same objective by using memories, each having three banks.

While each and every one of the ports of the above embodiment has two banks, the present invention is not limited thereto and, alternatively, only one of the ports may have two banks in an data output apparatus according to the invention.

Additionally, while the data storage 2 comprises HDDs in the above described embodiment, the present invention is not limited thereto and any non-linearly accessible (random access) recording medium can be used for the purpose of the invention. Therefore, the data storage 2 may alternatively comprises optical disks such as DVDs (digital video disks) or opto-magnetic disks such as MOs (magneto-optical disks). Still alternatively, the data storage 2 may comprise semiconductor memories such as DRAMs or flash memories.

What is claimed is:

1. A data output device comprising a plurality of data input/output means and a control means for allocating time slots to said data input/output means respectively for each cycle period having a predetermined time length, each of said data input/output means being adapted to read data from a non-linearly accessible recording medium and outputting said data in its own allocated time slot, characterized in that:

at least one of said data input/output means has a memory means consisting of first and second banks for storing a volume of data good for a cycle period in its own allocated the time slot; and said control means controls said recording medium and said memory so as to read out a volume of data good for a first cycle period from said recording medium and store it in the first bank of said data input/output means in its own time slot and so as to read out a volume of data good for a second cycle period on the way of reading out said data good for said first cycle period and store it in the second bank of the data input/output means in the next its own time slot and start outputting data from the first bank after a preselected time, the switching from said first bank to said second bank taking place at a predetermined timing.

2. A data output apparatus according to claim 1, characterized in that:

said recording medium is a number of pieces of hard disks;

said data includes image data; and said control means controls said recording medium and said memory so as to read out a volume of image data good for a first cycle period from said recording medium and store it in the first bank of said data input/output means in its own time slot and so as to read out a volume of image data good for a second cycle period on the way of reading out said data good for said first cycle period and store it in the second bank of the data input/output means in the next its own time slot.

3. A data output apparatus according to claim 1, characterized in that:

said control means controls said recording medium and said memory so as, upon receiving a control command for data output, to read out a volume of data good for a first cycle period from said recording medium and said store it in the first bank of said data input/output means in its own time slot and so as to read out a volume of data corresponding to the timing of receiving said control signal and storing said data in the second bank of said data input/output means in the next own time slot, the switching of data output from said first bank to said second bank taking place at a timing corresponding to the timing of receiving said control signal.

4. A data output method for reading out from a non-linearly accessible recording medium in the own time slots of a plurality of data input/output means allocated with the respective time slots for each cycle period having a predetermined time length and outputting the data, characterized by comprising for each of the data input/output means:

a first step of reading out a volume of data good for a first cycle period from the recording medium in its own time slot and storing it in the first bank of said data input/output means;

a second step of reading out a volume of data good for a next cycle period on the way of reading out said data good for said first cycle period and store it in the second bank of said data input/output means;

a third step of outputting said data for the first cycle period stored in said first bank after a preselected time; and a fourth step of outputting said data for the second cycle period stored in said second bank at predetermined timing.

5. A data output method according to claim 4, characterized in that, upon receiving a control command for outputting the data recording in said recording medium, a volume of image data corresponding to the timing of receiving said control signal is read out and stored in the second bank of said data input/output means in the next own time slot in said second step, and the stored data stored in said second bank for the next own time slot is output is output at the timing corresponding to the timing of receiving said data output command in said second step.

6. A data output device comprising a plurality of data input/output means and a control means for allocating time slots to said data input/output means respectively for each cycle period having a predetermined time length, each of said data input/output means being adapted to read data from a non-linearly accessible recording medium and outputting said data in the time slot allocated to it, characterized in that:

at least one of said data input/output means has a memory means consisting of first and second banks for storing a volume of data good for a cycle period in its own allocated the time slot;

said control means controls said recording medium and said memory means so as, upon receiving a control command for reproducing data, to cause said first bank to output the data stored in it after a preselected time period and said second bank to read a volume of data good for a cycle period from said recording medium as data succeeding said data and store it in itself in the next time slot allocated to said data input/output means after the time slot used for storing said data into said first bank, the switching from said first bank to said second bank taking place at a predetermined timing.

7. A data output apparatus according to claim 6, characterized in that:

when no data is stored in said first bank and said second bank, said preselected time period is the time period from the time when said input/output processing section issues a data read out command to said non-linearly accessible recording medium to the time when data is stored in said first bank or said second bank and output in the own time slot after the next one allocated to it.

8. A data output apparatus according to claim 6, characterized in that:

when a volume of data good for a predetermined cycle period is stored either in said first bank or in said second bank, said preselected time period is equal to or less than the time period of said time slot.

9. A data output apparatus according to claim 6, characterized in that:

said non-linearly accessible recording medium is a disk array comprising a plurality of hard disks arranged in parallel.

10. A method for reading our from a non-linearly accessible recording medium in the own time slots of a plurality of data input/output means allocated with the respective time slots for each cycle period having a predetermined time length and outputting the data, characterized by comprising for each of the data input/output means:

a first step causing said first bank of said data input/output means, upon receiving a control command for reproducing data, to output the data read out from said recording medium and stored in it in its own allocated time slot after a preselected time period;

a second step of reading out a volume of data good for a cycle period from said recording medium as data succeeding said data and storing it in the second bank of said data means in the next own time slot after said own time slot; and a third step of switching from said first bank to said second bank so as to make the data output in said second step immediately succeed the data output in said first step.

11. A data output method according to claim 10, characterized in that:

said preselected time period of said first step is the time period from the time when said input/output processing section issues a data read out command to said non-linearly accessible recording medium when no data is stored in said first bank and said second bank to the time when data is stored in said first bank or said second bank and output in the own time slot after the next one allocated to it.

12. A data output method according to claim 10, characterized in that:

when a volume of data good for a predetermined cycle period is stored either in said first bank or in said second bank, said preselected time period is equal to or less than the time period of said time slot.

13. A data output method according to claim 10, characterized in that:

said non-linearly accessible recording medium is a disk array comprising a plurality of hard disks arranged in parallel.

* * * * *